Sept. 25, 1951 L. HAAPALA 2,569,307
MACHINE FOR SHREDDING AND DISINTEGRATING
VEGETABLE STALKS
Filed Feb. 14, 1949 2 Sheets-Sheet 1
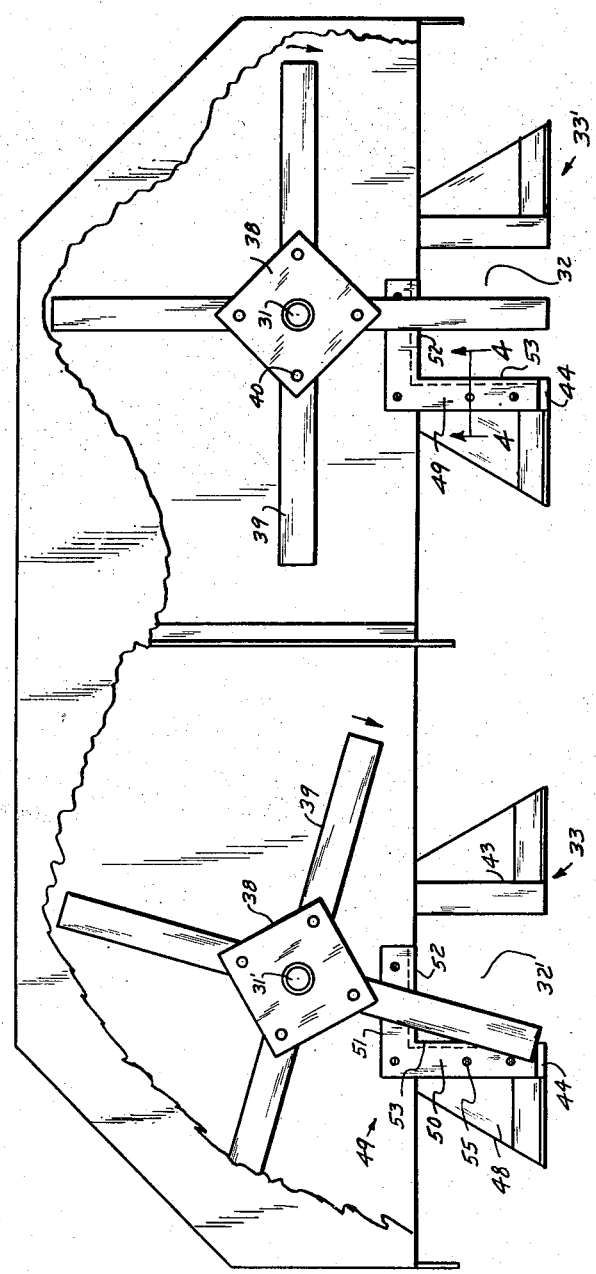
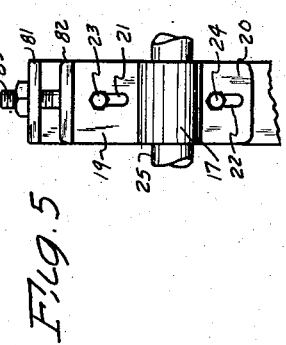
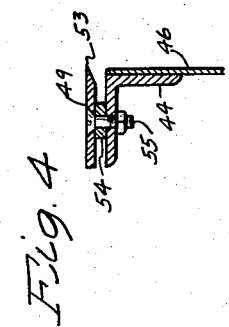
INVENTOR.
LEVI HAAPALA
BY
ATTORNEY

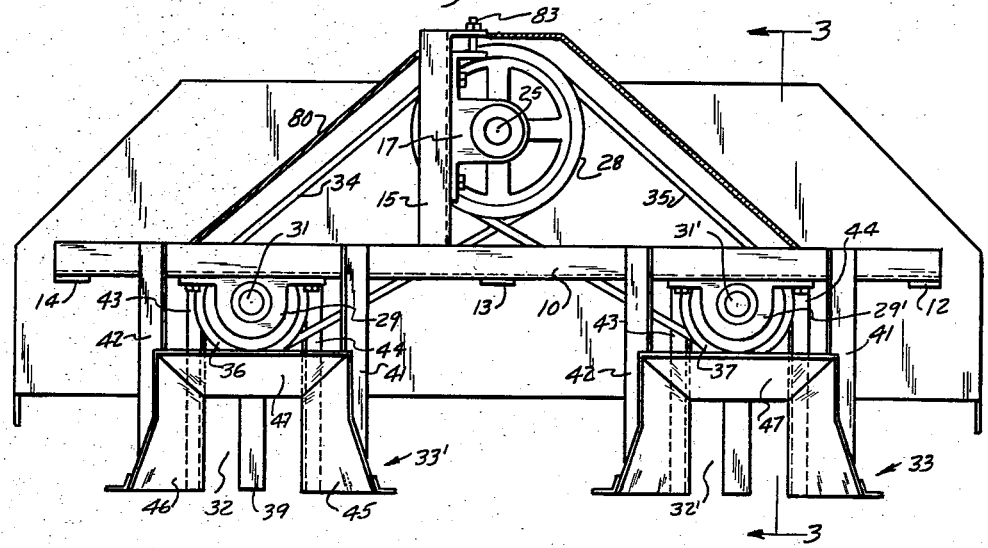
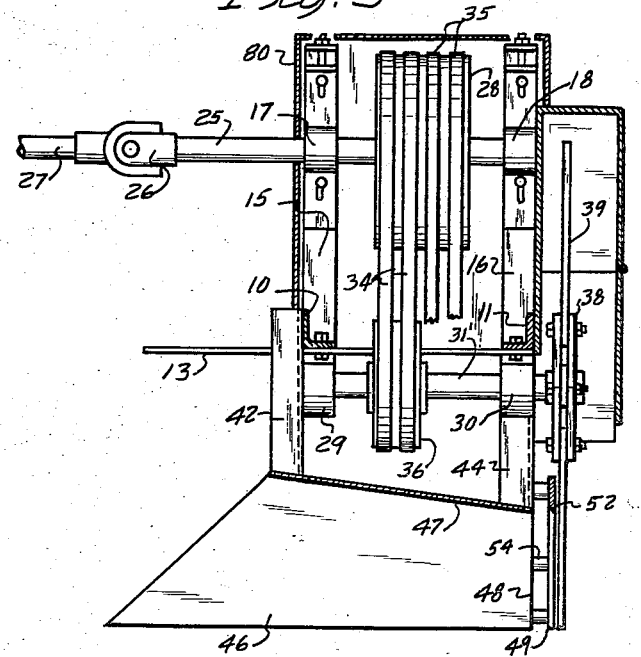

Patented Sept. 25, 1951

2,569,307

UNITED STATES PATENT OFFICE 2,569,307

MACHINE FOR SHREDDING AND DISINTEGRATING VEGETABLE STALKS

Levi Haapala, Dassel, Minn., assignor to Whiteley and Caine, Minneapolis, Minn., a partnership Application February 14, 1949, Serial No. 76,378

5 Claims. (Cl. 55—61)

My invention relates to a machine for shredding and disintegrating vegetable stalks, such as cornstalks. It is an improvement of my application for device for shredding and disintegrating vegetable stalks, Serial No. 60,437, filed November 17, 1948.

In that application it is pointed out that a pest known as the European corn borer has been introduced into the United States. For a time little attention was paid to it. Now, however, the pest has become quite widely distributed and seriously threatens the annual corn crop. The pest reproduces itself in a well-known manner. The moth lays eggs on or in the cornstalk. The larvae eats the material of the cornstalk and finally forms a cocoon-like nesting for the winter in the pith of the cornstalk. When spring and warm weather come the pupa comes out as a moth or butterfly and lays eggs upon the green stalks. If the stalk and stump where the corn borer nest exists is beaten to pieces to expose the larvae or pupa to weather conditions, they will die.

Further, disintegrating the vegetable stalks, particularly cornstalks, is not only of importance in controlling the corn borer pest, but by disintegrating the stalks the disintegrated mass wil be much more readily plowed under and will rot and disintegrate in the humus, so important in soil conservation, far more effectively than if the stalks are plowed under whole.

In the above noted former application I have shown mechanisms for disintegrating cornstalks including a head and a shaft carrying free swinging beater bars, the shaft being connected to a source of power, together with a funnel-like member for gathering the stalks together so as to be more effectively engaged by the beater bars.

It has been found that it is absolutely necessary to center the shaft carrying the beater bars directly over the row of cornstalks or other vegetable stalks and stalks to be disintegrated. Further, that as the beaters are rotated across the opening to the throat of the stalk collector, some of these stalks may be lifted by beaters and if they are green and wet or damp and limp, they may not be completely disintegrated.

I have discovered that by positioning a knifelike member at the edge and for a short distance along the top of the throat on the side toward which the beaters move, the stalks will be literally chopped into pieces regardless of their being green, moist or otherwise limp.

I have also discovered that to tighten the belt drive to operate the beaters, the fixed centering of the beater shafts above the rows must not be disturbed and that belt tightening may be effected by merely elevating the pillow blocks forming bearings for the main drive shaft.

It is a principal object of my invention, therefore, to provide a knife-like member at the back of the throat of the stalk-gathering member with a portion extending along the side of the throat toward which the beater bars move when in operation and another portion extending outwardly a desired distance along the top of said throat.

It is a further object of my invention to form said knife-like member with its two parts integrally connected and the part that extends along the side held vertical and the part extending along the top at right angles thereof, except that the edge thereof will slope slightly downwardly.

It is a further object of my invention to have the knife members removably connected with the throat so that it can be taken off and sharpened, and for replacement.

It is a further object of my invention to hold the knife-like member positioned along a side and the top of the throat with the edges of the member in the plane of the edges of the throat so as to form a continuous cutting surface extending across the top and down one side of the throat so as to form a cutting surface having a 90° angle that cooperates with the beater bars to assure absolute severing of stalks driven against the cutting surface.

The full objects and advantages of my invention will appear in connection with the detailed description thereof given in the following specification and the novel features by which the aforesaid useful and advantageous results are obtained are particularly pointed out in the claims.

In the drawing illustrating an application of my invention in one of its forms:

Fig. 1 is a rear end elevation of my stalk disintegrating apparatus with some parts broken away.

Fig. 2 is a front elevation of the same being viewed in reverse direction from that of Fig. 1.

Fig. 3 is a longitudinal central sectional view taken on line 3—3 of Fig. 2, showing the driving connection and relation of the parts.

Fig. 4 is a sectional view taken on line 4—4 of Fig. 1.

Fig. 5 is an enlarged face view of the pillow block supporting the main shaft.

As illustrated, and having reference particularly to Figs. 2 and 3, angle iron frame members 10 and 11 form a transverse support for the operating parts of my device and are connected together by longitudinal plates 12, 13 and 14. A pair of vertical angle iron uprights 15 and 16 support respectively pillow blocks 17 and 18. The flanges 19 and 20 of these pillow blocks are provided with elongated slot openings 21 and 22, Fig. 5, through which extend bolts 23 and 24. A drive shaft 25 has journaled support in the pillow blocks 17 and 18.

This drive shaft is provided with a universal joint 26 which connects it with a power shaft 27 that may run to any source of power, such as the power-take-off of a tractor for drawing the apparatus over the ground.

Upon the shaft 25 is mounted a pulley 28. This is a multiple pulley having two sets of grooves, which may be V-grooves or hexagon grooves, according to the type of belt which it is desired to employ.

Two additional sets of pillow blocks 29, 29′, 30, 30′ are mounted on the transverse bars 10 and 11 and respectively journal a pair of shafts 31, 31′.

As shown, shafts 31 and 31′ are exactly centered over the open throats 32 and 32′ of stalk-gathering tunnel members, designated generally 33 and 33′. And the main drive shaft 25 is spaced vertically a considerable distance up from the plane running through the axial centers of shafts 31 and 31′, and is exactly centered between these shafts.

Two sets of belts from pulley 28, designated as 34 and 35, run respectively to pulleys 36 and 37, that are secured on the shafts 31 and 31′.

It will be obvious that with the arrangement above described, when the pillow blocks 17 and 18 are lifted, as can be done by releasing bolts 23 and 24 on each of them and sliding the blocks upward with the bolts relatively moved along the slots 21 and 22, the sets of belts 34 and 35 will be suitably tightened without changing the centering relation of shafts 31 and 31′ with respect to throats 32 and 32′.

The uprights 15 and 16 extend upwardly through a shield 80 for protecting against moving parts, and are provided with an outwardly extending lip 81 which faces inside the shield a corresponding lip 82 on the upper flange of pillow blocks 17 and 18. A belt tightening bolt 83 is threaded into an opening in the flange on the pillow block and has its head take against the flange of the frame members 17 or 18, so that when the bolt is turned it will lift the pillow blocks 17 or 18 and the desired amount of movement for producing the right tightening of the belt can easily be effected.

Upon shafts 31 and 31′ are heads 38. These heads may be of any desired form, but a particular and useful form is that shown, which is rectangular with flail-like beater bars 39 pivoted at the corners 40 of the heads and whose outer ends, as shown in Fig. 3, extend to a point parallel with the lower edge of the stalk-gathering members 33, 33′. The shafts 31 and 31′ will be rotated at relatively high speed, from 1200 R. P. M. to even higher speeds.

Having reference to Fig. 2, there are two sets of vertical angle iron supports connected with the frame members 10 and 11. Supports 41 and 42 are connected with transverse frame members 10 and support the front part of the chutes 33 and 33′. Supports 43 and 44 are connected with transverse member 11 and support the rear part of the chutes 33 and 33′ practically at the side edges of the throats 32 and 32′. The chutes include forwardly and outwardly flaring side plates 45 and 46, and an upwardly flaring top plate 47 which produces an open-bottom chute having its narrowest part at 48.

In rear of the stalk-gathering members 33, 33′ and secured to the respective supports 44 of each of the stalk-gathering members is a shear plate 49. Each of the shear plates 49 is composed of a vertical portion 50 and a horizontal portion 51. These portions are shown as an integral member, but they could, if desired, be made of two separate portions. The horizontal portion 51 has a bevelled cutting edge 52 on its lower surface which edge extends from the outer surface of the plate towards its inner surface so that the cutting edge is on the rearmost part of the plate. The vertical portion 50, as shown in Fig. 4, has a bevelled cutting edge 53 which extends as a continuation of the bevelled surface 52 and is likewise on the inner surface of the plate adjacent the supporting member 44. Each of the shear plates 49 is held in place by a plurality of bolts 55, and between each of the shear plates and the support 44 are spacing members 54 to space the shear plate outwardly from the support. The purpose of the shear plates 49 is to provide a shearing action on material which is driven against the cutting edges 52, 53 by the beater bars 39.

In operation, as the structure is moved relative to the ground, it is so disposed that each of the stalk-gathering means 33, 33′ will extend along a row of stalks so that as the machine progresses relative to a field, the rows of stalks are respectively brought within the chutes 32, 32′ wherein the stalks are bent forwardly. The beater bars 39 rotating at a high speed in rear of the stalk-gathering members, produce a disintegrating action by first having their outer ends engage the stalks adjacent their root portions to beat or tear the stalks at the ground level. As many of the stalks may be green or of tough fibrous material, the beater bars will cause the upper portions of the stalks to be moved upwardly to the left, as indicated by the arrows in Fig. 1, where the inner portions of the beater bars will cause the stalks to be brought against the cutting edges 52, 53. In order that a good cutting action be produced, a sufficient number of spacers 54 are introduced between each supporting member 44 and the shear plates 49 so as to bring the outer surface of the shear plates in relatively close shearing relationship with the beater bars 39.

The advantage and utility of my invention is in providing an improved means of disintegrating vegetable stalks in such a manner as to destroy the entirety of the stalks, including the root portions as well as the upper stalk portions including the leaves. This is important because it is necessary to destroy the entirety of the stalk portion and particularly the lower stalk portion in order to eliminate areas within which pests may remain over the winter season and from which a new generation of pests can come in the following growing season.

A particular advantage in the invention is that the outer extremity of each of the beater bars contacts the stalks at the ground level to destroy the lower portion in a beating action and in the cooperative relationship of the beater bars and shear plates which causes disintegration of the remainder of the stalk portions by the cooperative action of the inner parts of the beater bars. The beater bars themselves are composed of very hard metal so that if obstructions such as stones or the like are present on the ground, the length of the beater bars plus the enormous centrifugal force developed by the entire driving connection is such that instead of injuring the beater bars, the stone will be either broken or knocked out of the way. Thus it should be understood that two distinct actions are obtained from the beater bars. The first being the beating action of their outer ends, and the second being the shearing operation which occurs on their inner portions where they pass in cooperation relationship with the shear plates.

I claim:

1. In a device for disintegrating vegetable stalks, in combination, a stalk gathering tunnel formed of a top and side walls and having open front and rear ends, a driven member supported above the tunnel and projecting longitudinally beyond the rear end of the tunnel, a plurality of rectangular beater bars loosely pivoted at their inner ends to said driven member in rear of the tunnel for rotation in a plane transverse to the tunnel, and a shear plate carried on the rear end of the tunnel and having a beveled cutting edge projecting horizontally across the top and vertically along one side of the rear opening and forming a substantially 90° cutting surface which cooperates with the inner edges of the beater bars for shearing material driven by said bars against the cutting edge.

2. In a device for distintegrating vegetable stalks, in combination, a stalk gathering tunnel formed of a top and side walls and having open front and rear ends, a driven member supported above the tunnel and projecting longitudinally beyond the rear end of the tunnel, a plurality of rectangular beater bars loosely pivoted at their inner ends to said driven member in rear of the tunnel for rotation in a plane transverse to the tunnel, and a shear plate carried on the rear end of the tunnel which commences on one side of the tunnel and projects across the top of the tunnel the inner edge of said plate formed in a sharp bevel and forming a cutting surface which cooperates with the inner edges of the beater bars for shearing material driven by said bars against the cutting edge.

3. In a device for disintegrating vegetable stalks, in combination, a stalk gathering tunnel formed of a top and side walls and having open front and rear ends, a driven member supported above the tunnel and projecting longitudinally beyond the rear end of the tunnel, a plurality of rectangular beater bars loosely pivoted at their inner ends to said driven member in rear of the tunnel for rotation in a plane transverse to the tunnel, and a vertical shear plate carried on the rear end of the tunnel at one side thereof, said shear plate having a relatively sharp beveled cutting edge which cooperates with the inner edges of the beater bars for shearing material driven by said bars against the cutting edge.

4. In a device for distintegrating vegetable stalks, in combination, a stalk gathering tunnel formed of a top and side walls and having open front and rear ends, a driven shaft supported above the tunnel and projecting longitudinally beyond the rear end of the tunnel, a pair of plates secured to said shaft in rear of the tunnel, a plurality of linear beater bars loosely pivoted at their inner ends between said plates for rotation in a plane transverse to the tunnel, and a shear plate carried on the rear end of the tunnel at one side thereof and having a beveled cutting edge which projects vertically up one side of the tunnel and horizontally across the top of the tunnel to form a substantially 90° cutting surface at one corner of the top of the tunnel, said cutting edge cooperating with the inner edges of the beater bars for shearing material driven by said bars against the cutting edge.

5. In a device for disintegrating vegetable stalks, in combination, a stalk gathering tunnel formed of a top and side walls and having open front and rear ends, a driven shaft supported above the tunnel and projecting longitudinally beyond the rear end of the tunnel, a pair of rectangular plates mounted in spaced relation to each other on the shaft in rear of the tunnel, a plurality of rectangular beater bars each loosely pivoted at its inner end between said plates and at the corners of said plates for rotation in a plane transverse with the rear of the tunnel, said bars being of a length that their outer ends are adapted to strike stalks gathered by the tunnel at substantially the ground level, and an angularly shaped plate mounted on the rear end of the tunnel, said plate having a beveled shearing surface formed on its inner angular edge which cooperates with the inner edges of the beater bars for shearing material when the latter is driven against either of the beveled edges by the beater bars.

LEVI HAAPALA.

REFERENCES CITED

The following references are of record in the file of this patent:

UNITED STATES PATENTS

| Number | Name | Date |
| --- | --- | --- |
| 657,411 | Hamm | Sept. 4, 1900 |
| 1,698,724 | Johnston et al. | Jan. 15, 1929 |
| 2,221,593 | Lessmann | Nov. 12, 1940 |
| 2,479,510 | Pollard et al. | Aug. 16, 1949 |

OTHER REFERENCES

Farm Implement News Magazine, issue of January 15, 1948, page 16, "Humboldt Stalk Cutter" advertisement.